Jan. 24, 1928.
W. DIETZEL
1,657,374
WHEEL
Filed May 22, 1925
2 Sheets-Sheet 1
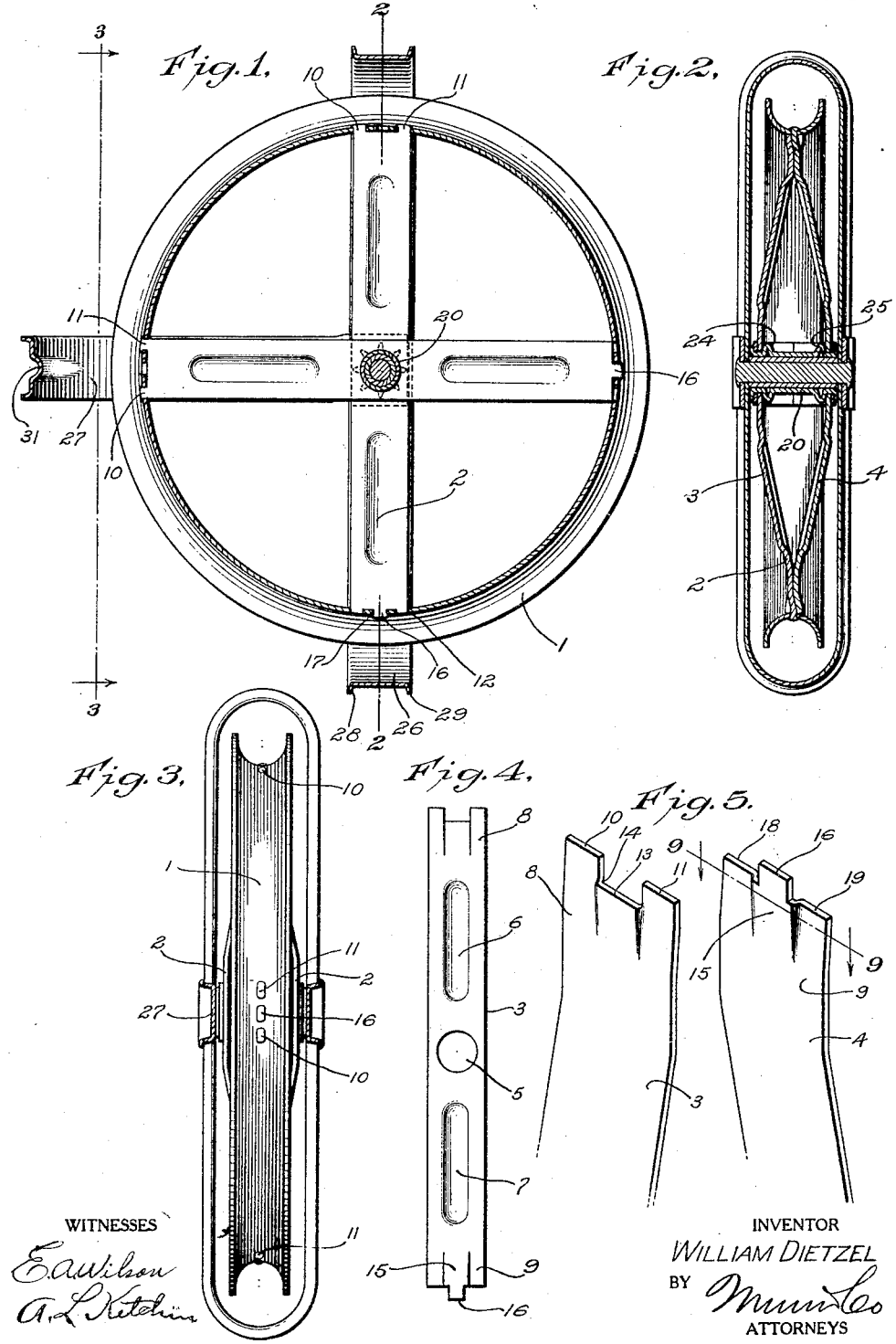
INVENTOR
WILLIAM DIETZEL
ATTORNEYS Jan. 24, 1928.
W. DIETZEL
1,657,374
WHEEL
Filed May 22, 1925
2 Sheets-Sheet 2
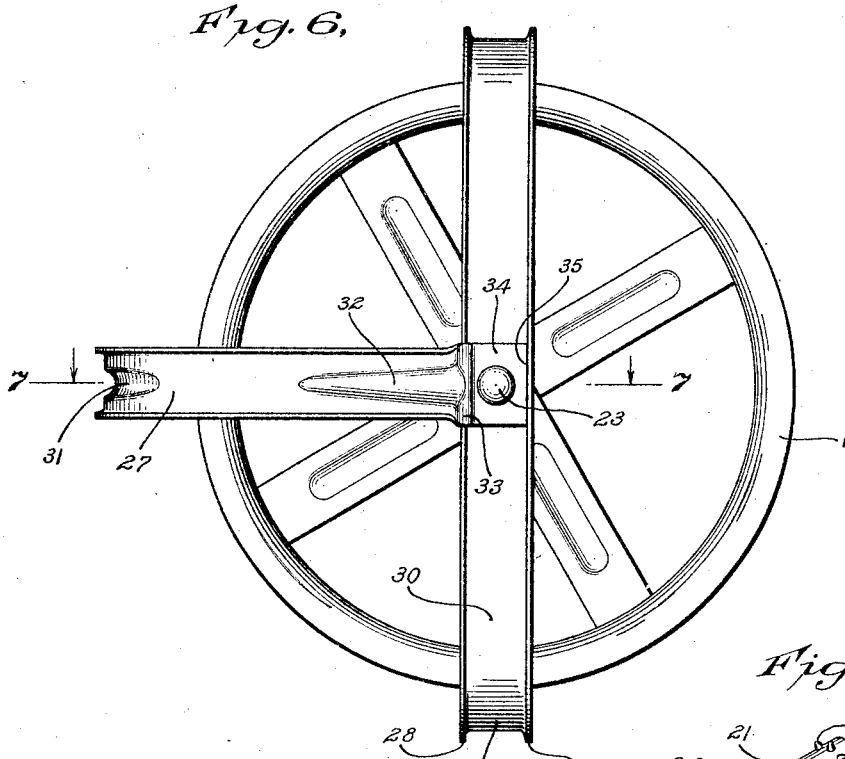
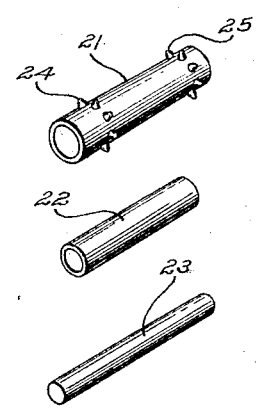
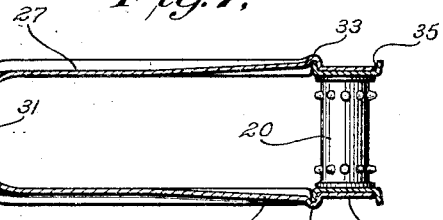
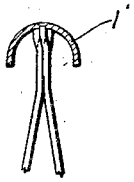
WITNESSES
INVENTOR
WILLIAM DIETZEL
BY
ATTORNEYS Patented Jan. 24, 1928.

1,657,374

UNITED STATES PATENT OFFICE.

WILLIAM DIETZEL, OF MERRICK, NEW YORK.

WHEEL.

Application filed May 22, 1925. Serial No. 32,175.

This invention relates to wheels and particularly to an improved construction of stamped wheel formed from sheet metal and has for an object to provide a construction which may be readily utilized as clothesline pulley wheels, hand wheels or wheels capable of use for other purposes.

Another object is to provide a sheet metal wheel with a rim stamped from a single piece of sheet metal and formed continous.

A still further object of the invention is to provide a pulley wheel in which a hub structure is provided capable of easy assemblage without distorting any parts of the wheel structure.

In the accompanying drawings—

Figure 1 is a sectional view through a clothesline pulley wheel disclosing an embodiment of the invention.

Figure 2 is a sectional view through Figure 1 on line 2—2.

Figure 3 is a sectional view through Figure 1 on line 3—3.

Figure 4 is an elevation of one of the spoke plates, the same embodying certain features of the invention.

Figure 5 is a perspective view of one end of a pair of spoke plates showing how the ends are adapted to interlock so as to align the rivet extensions.

Figure 6 is a side view of the pulley shown in Figure 1.

Figure 7 is a sectional view through Figure 6 on line 7—7, the spokes and rim being eliminated.

Figure 8 is a view showing a group of members forming the hub shown in Figure 7.

Figure 9 is an enlarged sectional view through Figure 5 on line 9—9 of said figure.

Figure 10 is a fragmentary sectional view showing a modified form of the invention wherein the rim is turned inwardly instead of outwardly.

In constructing a wheel, it has been found very desirable to make the rim of the wheel of a single endless piece. Heretofore, the ring has been made from flat material stamped into the desired shape and then bent so that the ends would meet or overlap. Various means have been provided for securing these ends together so as to complete the rim. In some instances, the spokes of the wheel were provided with spaced rivet extensions acting as means for holding together abutting ends of a rim. In connecting the ends of the various members together as described, extra work was required and also the finished product was not as accurate as might be desired. In order to overcome these difficulties and to make a simple but very accurate and desirable structure, the present invention includes the formation of the ring or rim of the wheel in one continuous piece.

Referring to the accompanying drawings by numerals, 1 indicates a ring formed of sheet metal and stamped into the desired shape which is semi-circular in cross section as illustrated in Figure 2. This ring or rim is formed in a die and pressed or stamped into the complete finished shape as shown in Figures 1, 2, 3 and 6. It will be noted from Figure 1 that there is no joint at any point as the ring is made continuous throughout, thereby giving a very smooth surface for the rope used thereon. The ring is made from flat sheet metal and is stamped or rather formed into the finished shape as illustrated in Figures 1 and 3 by suitable dies. The ring 1 is provided with a plurality of spokes 2 which are made from stamped sheet metal, said spokes being formed double, namely, with sections 3 and 4, said sections being identical in construction and formed as illustrated particularly in Figures 4 and 5.

As indicated in Figure 4, section 3 is provided with an aperture 5, pressed up portions 6 and 7 acting as stiffening members or beads and specially constructed end portions 8 and 9. The end portion 8 is shown at the left in Figure 5 and consists of a pair of extensions 10 and 11 adapted to be forced through suitable apertures 12 in ring 1. Between the base of these extensions, the section 3 is pressed to one side as indicated by the pressed portion 13. By pressing this section to one side, a depression 14 is presented adapted to receive the pressed out portion 15 of the opposite section, namely, section 4. An extension 16 projects from the pressed out portion 15, said extension being adapted to project through the central opening 17 when the spoke is in position. It will be noted that the section 3 at end 8 is formed as shown at the left in Figure 5 and end 9 is formed as shown at the right in Figure 5. It will be understood that the pressed portions 13 and 15 are not sharply defined but are only pressed slightly as more accurately indicated in Figure 9 from which it will be observed that the portion 15 is only pressed to one side with the extent of about half the thickness of the material. The same is true in regard to the pressed portion 13 and when the portion 15 fits into the depression or socket 14, the projections 10, 11 and 16 will all be in line whereby the respective apertures 12 and 17 may be positioned centrally of the ring 1 as shown in Figure 3. This permits ready punching of the ring for forming these apertures and also permits easy riveting of the extensions 10, 11 and 16. In addition to arranging the projections 10, 11 and 16 centrally for easy riveting and the like, the upper edge of portion 13 will fit snugly against the rim 1 and also the shoulders or edges 18 and 19 will also fit snugly against the ring 1 and thereby act as an additional support or brace for making a strong, firm structure.

The various spokes 2 are connected together at the point of crossing by a member 21 which is associated with the tubular member 22, member 21 acting as a hub casing while member 22 acts as a bushing and also as a spacing member when the rivet or shaft 23 is placed in position as shown in Figure 2. The tubular members 21 and 22 may be made from any desired material but preferably the bushing 22 is made from bronze whereby an easy turning structure is presented. The tubular member or casing 21 is provided with two series of pressed up lugs 24 and 25 as indicated in Figures 2 and 8. When assembling the hub and spokes, the spokes are fitted over the ends of the casing 21, which ends pass through the various openings 5 so that one set of sections 3 and 4 will press against the projections 24 and 25 and the other set of sections 3 and 4 will rest on top of the first set of sections. This completes the wheel structure and said wheel structure is ready for use as a pulley or for any other purposes desired. When used as a pulley it is mounted in the guard 26 and the hanger 27 as shown in Figures 2, 6 and 7. The guard 26 is made sufficiently wide to permit the hub 20 to be readily fitted into position but before it is fitted into position a bushing 22 is supplied, which bushing is preferably slightly longer than the tubular member 21 after the tubular member has been bent over as shown in Figure 2. This will cause the guard 26 to press against the bushing 22 and allow the hub to rotate loose. The pintle or rod 23 is then inserted and up-set or riveted as shown in Figure 2. By reason of the fact that the bushing 22 is longer than the tubular member 21, the riveting action will not cause the hub to be pinched and, consequently, after the rod 23 has been properly riveted the wheel may freely rotate.

It will be noted that by this construction and arrangement the guard 20 is not bowed or distorted when applying the wheel but the wheel is merely loosely placed in position and rod 22 riveted firmly in place.

After all the parts of the wheel have been assembled, the rod 23 is riveted into position and a very rigid connection is provided for the hanger 27. It will also be noted that a minimum number of parts are used while maximum strength is secured. Under some circumstances, instead of having a groove formed in the ring 1, the parts may be reversed as shown in Figure 10 wherein the ring 1' is formed arc-shaped in cross section with the opening facing the spokes. This form of wheel is particularly adapted for wheels for valves, certain forms of vehicles as well as for any desired purpose.

What I claim is:

1. In a metallic wheel, a rim provided with a plurality of groups of tenon receiving openings, said openings being arranged in pairs on diametrically opposite sides of the rim with the openings of each group in a straight line, spokes for said rim, each of said spokes being formed with a pair of sections, each section being formed at one end with a pair of spaced tenons and at the opposite end with a single tenon, said sections being arranged so that the end of one section having two tenons thereon is locked against the end of the other section having one tenon, all of said tenons being offset in such a manner that when the tenons are fitted into said openings they will be aligned and interlocked.

2. In a metallic wheel, a rim and a plurality of spokes therefor, and a hub connecting said spokes, each of said spokes being formed with a pair of sections, each section having a central aperture, a pair of tenons extending from one end adjacent the edges and a single tenon extending from the opposite end arranged centrally, said central tenon being offset from the plane of the section and the space between the tenons at the opposite end being also offset whereby when another section is superimposed thereon with the single centrally positioned tenon located between the two tenons they will all be in alignment and interlocked.

3. In a metallic wheel, a spoke structure comprising a pair of sections, each section having a pair of tenons extending from one end adjacent the edges and a single tenon extending from the opposite end arranged centrally, said central tenon being offset from the plane of the section and the space between the tenons at the opposite end being also offset whereby when another section is superimposed thereon with the single centrally positioned tenon located between the two tenons they will all be aligned and interlocked.

4. In a wheel, the combination of a single piece, continuous metal rim, having alined spaced apart tenon-receiving openings, spokes, each having tenons in interfitting and alined relation at the extremities thereof, and adapted to project through said alined openings, said openings arranged centrally of the rim, and said tenons being correspondingly arranged, there being an independent opening for each tenon.

WILLIAM DIETZEL.